June 14, 1927.  1,632,164
B. R. BENJAMIN ET AL
ADJUSTABLE SELF ALIGNING BUSHING
Filed Sept. 9, 1922
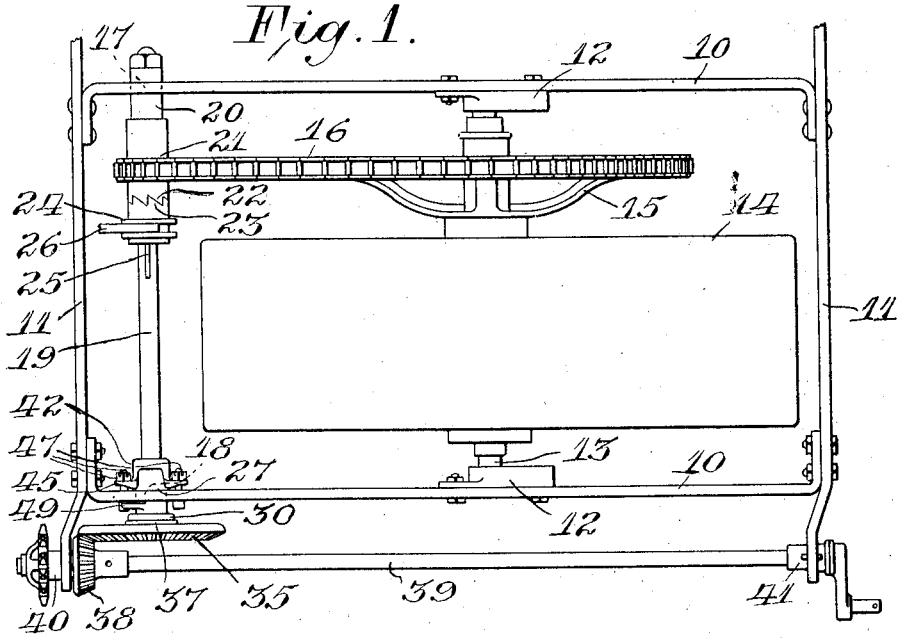
Inventors.
Bert R. Benjamin
and William Webber,
By H. P. Doolittle,
Atty.

Patented June 14, 1927.

1,632,164

UNITED STATES PATENT OFFICE.

BERT R. BENJAMIN, OF OAK PARK, AND WILLIAM WEBBER, OF LA GRANGE, ILLINOIS, ASSIGNORS TO INTERNATIONAL HARVESTER COMPANY, OF CHICAGO, ILLINOIS, A CORPORATION OF NEW JERSEY.

ADJUSTABLE SELF-ALIGNING BUSHING.

Application filed September 9, 1922. Serial No. 587,177.

Our invention relates to a gearing or a driving mechanism more particularly adapted to the driving mechanism of a harvester.

The primary object of our invention is to provide a mechanism in which the meshing relation of the driving gears of the harvester may be readily adjusted and retained in their adjusted positions.

A further object is to provide a simple and economical construction and one which can be easily manufactured and assembled.

A still further object is to provide a self-aligning and adjustable bearing bushing for a driving mechanism.

These and other objects are attained by providing a construction and arrangement of the various parts in the manner hereinafter described.

Referring to the drawings—

Fig. 1 is a top plan view of the main frame of a harvester showing our invention embodied therein;

Fig. 2 is an enlarged cross sectional detail view of our self-aligning and adjustable bearing support;

Fig. 3 is an enlarged detail view showing the manner in which the collar supports the bearing bushing;

Fig. 4 is a detail view showing the manner in which the bushing is retained on the main frame against rotation of the shaft; and Figs. 5 and 6 are plan and side elevational views respectively of the bushing supporting bracket or collar.

For the purposes of illustration, we have shown our improved driving or gearing mechanism embodied in the main frame of a harvester. This main frame comprises the two usual oppositely and longitudinally disposed main frame members 10 fixed to transversely disposed main frame members 11. The main frame members 10 are provided with the usual yoke or axle brackets 12 which are adapted to adjustably receive the main axle 13 of the main wheel 14. Fixed to the main wheel 14 is the usual driving sprocket 15 which is adapted to drive the driven elements of the harvester by the main chain 16. The main frame members 10 are provided with apertures 17 and 18 adjacent their rearward ends. Positioned in the apertures 17 and 18 of the main frame members 10 is a drive shaft 19. The grainward end of the shaft 19 is journaled in a bearing bushing 20 secured in the aperture 17 of the main frame members 10. Journaled on the shaft 19 adjacent the bearing bushing 20 is a driven sprocket 21 which is geared to the main sprocket 15 by means of the chain 16. The stubbleward end of the sprocket 21 is provided with clutch teeth 22 which are adapted to engage similar clutch teeth 23 of the driving collar 24 which is splined to the shaft 19 by means of a key 25. The usual shifter fork 26 is connected to the clutch collar 24 for shifting the same in and out of engagement with the clutch sprocket 21. The stubbleward end of the shaft 19 is journaled in a bushing 27 mounted in the aperture 18 of the stubbleward main frame member 10. The roller bushing 27 is provided with a chamber 28 which is adapted to receive an anti-friction roller bushing 29. The grainward end of the bushing 27 is provided with a longitudinally extending annular flange 30. Positioned within the flange 30 of the bushing 27 is a steel washer 31 which forms a ball race for the ball bearings 32 in taking up the end thrust exerted on the shaft 19. A second washer 33 positioned in a socket 34 formed in the beveled gear 35 forms the stubbleward ball race for the ball bearings 32. The gear 35 is fixed to the shaft 19 by threaded engagement with a stud 36 formed on the grainward end of the shaft 19. The gear 35 is further provided with an annularly disposed flange 37 extending laterally in a manner to overlap the annular flange 30 formed on the bushing 27 which completely encases the roller bearing. The gear 35 meshes with and drives a pinion 38 fixed to the crank shaft 39 journaled in the transversely disposed main frame members 11 by the bearing bushings 40 and 41 respectively.

Our improved self-aligning and adjustable truss bearing mechanism for adjusting the meshing relation of the gears comprises a collar 42 which is provided with a socket 43, an aperture 44 and laterally extending ears 45. The laterally extending ears 45 are provided with tapered apertures 46. The collar 42 is adapted to loosely fit over the shaft 19 by having the shaft extending through the aperture 44 and having the bushing 27 adapted to be seated in the socket 43. The collar 42 is adjustably supported on the longitudinal main frame member 10 by means of bolts and nuts 47 extending through apertures 48 in the frame member 10 and loosely through the tapered apertures 46 in the collar 42. It will be seen from this construction that the collar 42 is not only adjustable with respect to the main frame member 10 but is also spaced from said main frame member and is also laterally movable with respect to the main frame member within certain limits and thus permits the bushing 27 to be self-aligning on the shaft 19. In order to lock the bearing bushing 27 against rotation, a fork portion 49 is formed integrally with the bushing 27 and is adapted to embrace the head of the rear bolt 47 for this purpose.

In the operation of the above described mechanism, the proper meshing relation of the gears 35 and 38 is attained by adjusting the bearing bushing 27 by means of the collar 42 and adjusting bolts 47. It will also be noted that by reason of the collar 42 being spaced from the main frame member 10, the bearing bushing 27 may be adjustable laterally in a manner to align itself with the bearing on the other end of the shaft 19.

While, in the above specification, we have shown and described one embodiment which our invention may assume in practice, it will be understood that modification may be made from this construction without departing from the spirit and scope of our invention as expressed in the following claims.

What we claim as our invention and desire to secure by Letters Patent is:

1. In a driving mechanism, a frame, a shaft mounted for rotation in said frame, a bushing carried in the frame and forming a bearing for the shaft, and means engaging the bushing for moving it in the frame axially along the shaft to adjust it with respect to said frame and permitting self-alignment thereof in the frame with respect to the shaft during rotation of the shaft.

2. In a driving mechanism, a frame, a shaft mounted on said frame, a bushing carried by said frame and forming a bearing for said shaft, and means spaced from said frame for adjustably supporting said bushing and permitting self-alignment thereof.

3. In a driving mechanism, a frame, a shaft mounted on said frame, a bushing carried by said frame and forming a bearing for said shaft, and means spaced from said frame and loosely carried thereby engaging said bushing whereby said bushing is adjustable and self-aligning.

4. In a driving mechanism, a frame, a shaft mounted on said frame, a bushing mounted in said frame forming a vertical and horizontal thrust bearing for said shaft, and means for supporting said bushing for axial movement along the shaft and on the frame in a manner to be self-aligning and adjustable.

5. In a driving mechanism, a frame, a drive shaft having a gear fixed thereto, a driven shaft having a gear fixed thereto and meshing with said first named gear, a bushing mounted in said frame forming a bearing for said shaft and an end thrust bearing for said gear, and means on the frame supporting said bushing whereby it is self-aligning.

6. In a driving mechanism, a frame, a drive shaft having a gear fixed thereto, a driven shaft having a gear fixed thereto and meshing with said first mentioned gear, an adjustable bushing mounted on said frame and forming a bearing for said shaft, and means on the frame loosely engaging said bushing for adjusting the meshing relation of said gears and permitting self-alignment of the bushing.

7. In a driving mechanism, a frame, a drive shaft having a gear fixed thereto, a driven shaft having a gear fixed thereto and meshing with said first mentioned gear, a bushing mounted on said frame and forming a bearing for said shaft, and means spaced from said frame and loosely engaging said bushing for adjusting the meshing relation of said gears and permitting self-alignment of the bushing.

8. In a gearing mechanism, a frame, a drive shaft having a gear fixed thereto, a driven shaft having a gear fixed thereto and meshing with said first named gear, a bushing mounted in said frame and forming a bearing for said drive shaft and a thrust bearing for said first mentioned gear, and means comprising a collar loosely receiving said bushing and surrounding said drive shaft for adjusting the meshing relation of said gears and permitting self-alignment of the bushing.

In testimony whereof we affix our signatures.

BERT R. BENJAMIN.
WILLIAM WEBBER.